(12) United States Patent
Asplund et al.

(10) Patent No.: US 8,246,055 B2
(45) Date of Patent: Aug. 21, 2012

(54) MULTI-LOBED SEAL MEMBER (75) Inventors: Richard Asplund, Simi Valley, CA (US); David Varnon, Canyon Country, CA (US); Richard Spratling, Orinda, CA (US); Chad Hamilton, Fremont, CA (US)

(73) Assignee: Zodiac Pool Systems, Inc., Vista, CA (US)

( * ) Notice: Subject to any disclaimer, the term of this patent is extended or adjusted under 35 U.S.C. 154(b) by 377 days.

(21) Appl. No.: 12/395,494

(22) Filed: Feb. 27, 2009

(65) Prior Publication Data

US 2009/0218772 A1 Sep. 3, 2009

Related U.S. Application Data

(60) Provisional application No. 61/032,871, filed on Feb. 29, 2008.

(51) Int. Cl.
*F16L 17/00* (2006.01)
*F16J 15/02* (2006.01)

(52) U.S. Cl. .................. 277/609; 277/637; 277/644

(58) Field of Classification Search .............. 277/637, 277/644, 648, 649, 641
See application file for complete search history.

(56) References Cited

U.S. PATENT DOCUMENTS

| | | | |
|---|---|---|---|
| 1,593,041 A | | 7/1926 | Steward |
| 2,247,609 A | * | 7/1941 | Devibiss .................. 277/626 |
| 2,983,533 A | * | 5/1961 | Tisch ....................... 277/649 |
| 3,009,721 A | * | 11/1961 | Newton .................... 277/529 |
| 3,052,478 A | * | 9/1962 | Horvereid ................ 277/394 |
| 3,175,833 A | * | 3/1965 | Morse ...................... 277/574 |
| 3,288,475 A | * | 11/1966 | Benoit ..................... 277/566 |
| 3,909,019 A | * | 9/1975 | Leko ....................... 277/649 |
| 4,059,280 A | * | 11/1977 | Eastwood ................ 277/562 |
| 4,368,894 A | * | 1/1983 | Parmann .................. 277/615 |
| 4,693,343 A | * | 9/1987 | Boyd .................... 188/322.17 |
| 4,944,498 A | * | 7/1990 | Kortgen et al. ......... 267/64.11 |
| 5,002,290 A | * | 3/1991 | Pernin ..................... 277/649 |
| 5,394,601 A | * | 3/1995 | Sutton et al. ............... 29/451 |
| 5,626,520 A | * | 5/1997 | Mazziotti ................ 464/131 |
| 6,149,163 A | * | 11/2000 | Brown et al. ............ 277/560 |
| 6,173,969 B1 | * | 1/2001 | Stoll et al. ............... 277/630 |
| 6,264,206 B1 | * | 7/2001 | Hashizawa et al. ...... 277/641 |
| 7,066,927 B2 | * | 6/2006 | Chen et al. ................. 606/1 |
| 7,857,322 B2 | * | 12/2010 | Fietz ....................... 277/566 |
| 7,959,161 B2 | * | 6/2011 | Seki et al. ................ 277/648 |
| 2007/0148525 A1 | | 6/2007 | Kuroki et al. |

OTHER PUBLICATIONS

Jandy Pool Products, Inc., Copyright 2006 Stealth Pump Series Sell Sheet—L0973A; Drawings, Pictures and Model SHPF/SHPM Pump specifications on pp. 2.*
Zodiac Pool Systems, Inc., "Stealth (TM) Series Pums Installation and Operation Manual", obtained via link "Stealth I/O Manual" on: http://www.jandy.com/html/products/pumps/stealth/, May 17, 2011, See Figure 14—Model SHPF/SHPM Pump Exploded view and associated description, tables and specifications.*
Jandy 2007 Catalog, Pumps, Jandy Pool Products, Inc., 2007, 10 pages.

(Continued)

*Primary Examiner* — Vishal Patel
(74) *Attorney, Agent, or Firm* — Dorsey & Whitney LLP (57) ABSTRACT

A seal member for creating an adequate sealing engagement between two bodies. The seal member may have a closed loop shape, a plurality of engagement surfaces and a plurality of lobes formed on the engagement surfaces. The lobes may contact a sealing surface on a body to aid in creating an adequate seal between two bodies.

8 Claims, 9 Drawing Sheets

OTHER PUBLICATIONS

Jandy 2007 Catalog, Pump Parts, Jandy Pool Products, Inc., 2007, 11 pages.

Jandy 2008 Catalog, Pumps, Jandy Pool Products, Inc., at least as early as Feb. 29, 2008, 10 pages.

Jandy 2008 Catalog, Pump Parts, Jandy Pool Products, Inc., at least as early as Feb. 29, 2008, 11 pages.

Canadian Office Action dated Aug. 3, 2011, CA 2,656,784, 3 pages.

* cited by examiner

MULTI-LOBED SEAL MEMBER

CROSS-REFERENCE TO RELATED APPLICATIONS

This application claims, under 35 U.S.C. §119(e), the benefit of U.S. Provisional Application No. 61/032,871, titled "Multi-Lobed Lid Seal for Pump" and filed on Feb. 29, 2008, which is hereby incorporated by reference herein in its entirety.

BACKGROUND OF THE INVENTION

1. Technical Field

The present disclosure relates generally to seals used in fluid handling, and particularly in fluid systems for pools and spas.

2. Background

Seals allow two or more objects to be removably joined while lessening the possibility of fluid leakage between the seal surfaces of two objects. Traditionally, seals have been O-ring-type with a circular cross-section that allow generally one point of contact between the two seal surfaces. While O-rings are known to create sufficient seals between the seal surfaces, the compressive force required to create seal may be large. The large compressive force may make the two seal surfaces difficult to engage and disengage. For instance, where two objects are attached together with a threaded joint, they rotate relative to each other. The O-ring seal member disposed between the two surfaces is generally stationary relative to one of the seal surfaces while the other seal surface moves relative to the action requiring the operator to exert sufficient force to overcome both compression of the seal and friction between the seal and seal surfaces. Thus, creating an adequate seal by compressing the O-ring in a threaded joint may require more strength than can be supplied by some persons.

To create a sufficient seal using the O-ring member, the O-ring may require a high level of compression. The requirement of a high level of compression makes it difficult to join the seal surfaces of the two objects, and conversely to disengage the two objects thus limiting access to the sealed objects to a limited class of persons able to generate such force.

What is needed in the art is a seal member that creates a sufficient seal while requiring less compressive force than an O-ring seal member.

SUMMARY OF THE INVENTION

Most seals offer generally one point of contact between the ring and the objects being sealed. A sealing ring with multiple points of contact may provide added barriers against leakage in pressurized, vacuum, or atmospheric systems. One example of the current inventive structure includes a multi-lobed seal member that allows substantially "equal to O-ring" seal quality with less compression force required. The present disclosure describes a seal somewhat more compliant in at least one direction than other directions (i.e., where there is an imbalance of the number of lobes on one face versus the other). One of many applications of the unique structure is as a seal member of a removable leaf basket lid for a water pump/filter assembly for a pool system, as described herein. With use of the inventive structure, the lid is more easily locked, unlocked, removed, and reinstalled. The invention allows the operator to use less effort, and apply less compressive force, than current seal designs. Moreover, while the lobed seal member is engaged it maintains adequate sealing engagement for leak reduction or prevention during operation under pressure, vacuum, and/or atmospheric conditions.

In a fluid handling system for a pool or spa, many components must be fluidly connected together. These components may include a pool filter, a water heater, heat exchanger, salt, chlorine, ozone generators, or other water conditioning components, and various valves and controllers. The components may be fluidly connected together by piping, such as PVC pipe, and individual components themselves may be opened or broken down to allow access to the component. In operation, the water in the pool flows from the pool, through the fluid handling system, through and between the various components, and back to the pool. Maintenance and repair needs require adequate access to the various vales, pipes, and components of the fluid handling system by a variety of operators.

In various embodiments the valves, pipes, and components of the fluid handling system may be tightly packed into a limited space such as a pump room or pump shack. In some aspects the fluid handling system may be contained in a large chest wherein access is routinely achieved by reaching down into the chest. With limited space to work in, maintenance or repair requirements necessitate that access to the fluid handling system be relatively easy and straight forward.

Some aspects of the fluid handling system may require repeated access or access by various personnel. For these components, valves, and pipes it is often advantageous to place seals between sealable surfaces. Because persons with limited strength may be required to access these parts of the fluid handling system it is necessary that the sealed surfaces be both adequately sealed and disengaged with limited compressive force. In one example, pool filter components may be cleaned daily by persons of varying strength such as homeowners or lifeguards rather than maintenance personnel. Because these persons may be able to generate less force than a professional maintenance person it is desirable that the filter be opened and closed with limited compressive force while still providing an adequate seal of the fluid handling system.

Described herein are embodiments of lobed seal members for various aspects of fluid handling. In one embodiment, the lobed seal member includes an annular elastomeric member which may have two opposing engagement surfaces with one lobe positioned on one engagement surface and two lobes positioned on the other engagement surface. Other embodiments may have more than two lobes on an engagement surface, and lobed seal member embodiments may have equal numbers of lobes on each engagement surface. Further embodiments may have lobes positioned on adjacent (non-opposite) engagement surfaces. Still further embodiments may have a plurality of lobes on three or more engagement surfaces.

In the present disclosure, the lobed seal member may be positioned within an annular channel in a cap insert portion of a lid of the pool water pump/filter assembly. The lobed seal member is positioned to provide for a seal between the lid portion and a debris trap receptacle of the pump assembly. The lobed seal member is compressed by engagement of the lid with the debris trap receptacle.

Because the presently disclosed invention may provide an adequate seal with less compressive force it may allow access to various components, pipes, and valves of a pool or spa fluid handling system in cramped quarters or by persons of limited strength.

BRIEF DESCRIPTION OF THE FIGURES

FIG. 8 A shows a partial view of a water pump/filter assembly as in FIG. 1 in its assembled form, B shows an isometric view of a bayonet on the locking ring taken along line 8B in FIG. 1, C shows an isometric view of a flange on the upper rim of the debris trap receptacle from line 8C in FIG. 1.

FIG. 11A-I shows alternative embodiments of uncompressed lobed seal members positioned within the annular groove of the cap insert and resting on the lip of the debris trap receptacle.

DETAILED DESCRIPTION OF THE INVENTION

Described herein are embodiments of lobed seal members for use in sealing surfaces of components used in fluid handling in pool and spa environments. While applicable to many aspects of pool and spa systems, the multi-lobed seal member is described herein as it is used on a water pump/filter assembly. The present description is by way of example only, and is not limiting. The multi-lobed seal member may be used by itself or with other seal members to provide adequate sealing of seal surfaces between objects in many different components such as sand filters, chlorine generators, valves, and others. The lobed seal member generally has two lobed engagement surfaces. The lobed engagement surfaces allow the seal member to provide adequate leakage reduction or prevention with less compressive force. Other embodiments may have multiple lobes on an engagement surface, and may have the added benefit of providing multiple adequate seal barriers.

Figure 1:
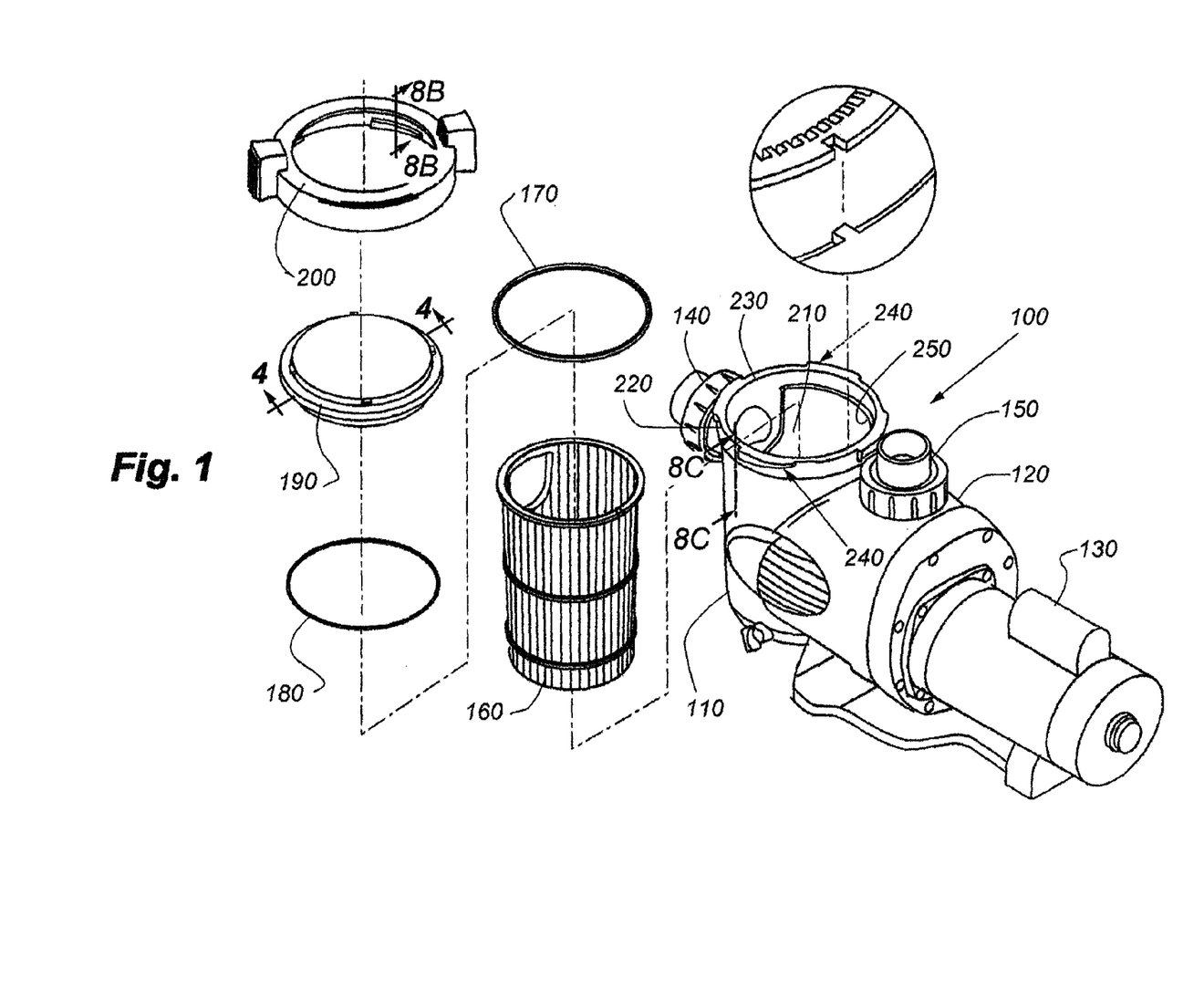
FIG. 1 shows an exploded view of a water pump/filter assembly used in a swimming pool setting.

As a brief introduction, in one application, as described herein, the lobed seal member may be used in a water pump/filter assembly for a pool or spa system. Referring generally to FIG. 1, the water pump/filter assembly 100 includes a debris trap receptacle 110 having an inner chamber 210. The inner chamber 210 receives a debris trap basket 160 for filtering out large objects such as leaves from re-circulated pool water. As is known in the art, when the pump is turned on, water is drawn in through a water inlet 140 in the debris trap receptacle 110, into the debris trap basket 160. The water is strained through the debris trap basket 160, flows into the impeller chamber (not shown), and then is pushed by the action of the pump motor 120 out the pump outlet 150 and back, eventually, to the pool (not shown). The water may flow through additional pool system components before and/or after flowing through the water pump/filter assembly 100.

In order to facilitate removal of debris from the debris trap receptacle 110, the water pump/filter assembly 100 may be opened to allow removal of the debris trap basket 160. Access to the debris trap basket 160 is achieved by removing the lid from engagement with the debris trap receptacle 110. The lid includes a locking ring array 200 and a cap insert 190. The lobed seal member 170 of the present invention is positioned between the lid and the top of the debris trap receptacle 110. The lobed seal member 170 may be seated within an annular channel in the cap insert, and it may create a seal between the lid and the debris trap receptacle 110.

The engagement surface of the lobed seal member 170 in contact with the cap insert 190 may have two lobes while the oppositely positioned engagement surface may have one lobe. Upon engagement of the lid and debris trap receptacle, the lobed seal member may be compressed to adequately seal the cap insert and the debris trap receptacle.

FIG. 1 is an exploded illustration of a water pump/filter assembly 100. The water pump/filter assembly 100 includes a debris trap receptacle 110, a pump housing 120, and a motor 130. The water pump/filter assembly 100 further defines a fluid inlet 140 positioned at the debris trap receptacle 110, and a fluid outlet 150 positioned at the pump housing 120, and in fluid communication with the fluid inlet 140.

As shown in FIG. 1, the debris trap receptacle 110 further includes a debris trap basket 160, a lobed seal member 170, an O-ring seal 180, a cap insert 190, and a locking ring 200. The cap insert 190 and the locking ring 200 make up the lid. The debris trap receptacle 110 includes a chamber 210 for receiving the debris trap basket 160. The debris trap receptacle 110 further defines an upper rim structure 220. The upper rim structure 220 further defines a lip surface 230 and a plurality of flanges 240 as further described below. Also shown is a bayonet 670 on the locking ring 200.

As will be described in more detail below, the O-ring seal 180 and the lobed-seal 170 may be mounted on the cap insert 190 and the cap insert 190 removably inserted into the locking ring 200 to create a lid, or locking ring assembly. The lid may removably engage the top rim of the debris trap receptacle 110. The lid is positioned such that the lobed seal member 170 engages the lip surface 230 at the upper rim structure 220 of the debris trap receptacle 110. When the lid is seated on the debris trap receptacle 110, the O-ring seal 180 may be in sealing contact with the interior wall 250 of the debris trap receptacle 110 and the lobed seal member 170 may be in sealing contact with the lip surface 230 of the debris trap receptacle 110. The lid may be removably attached to the debris trap receptacle 110 by rotating the lid in relation to the debris trap receptacle 110. As described below, portions of the locking ring 200 may engage the flanges 240 at the upper rim structure 220 of the debris trap receptacle 110 to draw the lid tightly into proximity and/or contact with the upper rim structure 220 of the debris trap receptacle 110. Some embodiments may not include an O-ring seal 180. Further embodiments may use the lobed seal member in conjunction with many different components of a pool fluid handling system in addition to the presently described water pump/filter assembly, such as without limiting by example, a sand filter or other component as described in U.S. patent application Ser. No. 12/246,397, Methods and Apparatus for a Pool Treatment and Water System, which is incorporated by reference here in its entirety.

Figure 2:
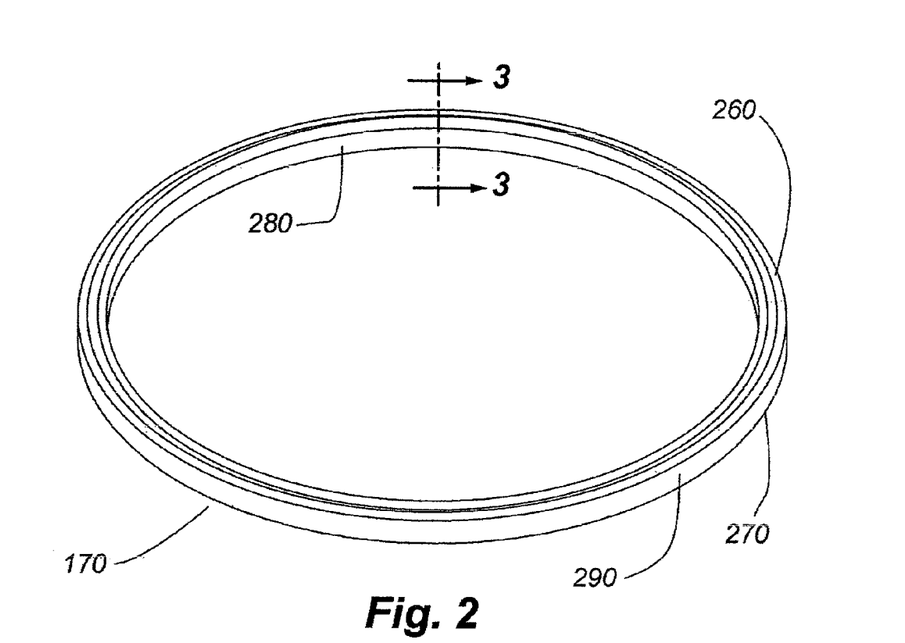
FIG. 2 is a perspective view of the top of a lobed seal member.
Figure 3:
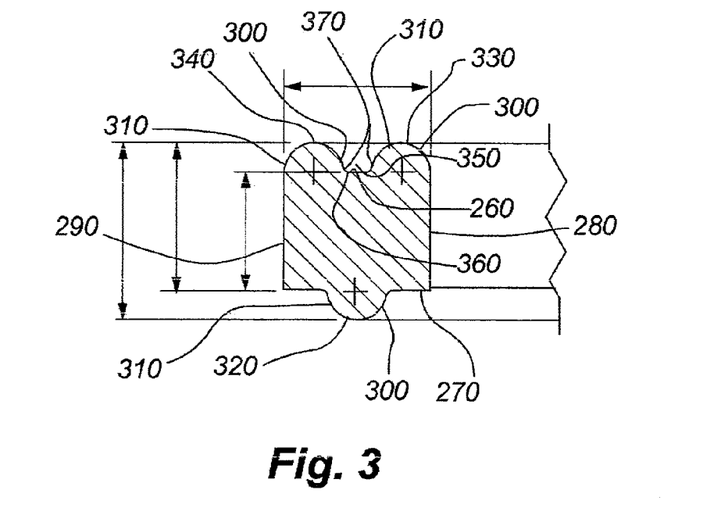
FIG. 3 is a section of the lobed seal member taken along line 3-3 of FIG. 2.

FIG. 2 shows a perspective view of the lobed seal member 170. A sectional view of the lobed seal member 170, taken along line 3-3, is shown in FIG. 3. In the present embodiment, the lobed seal member 170 has four sides. There are two opposing engagement surfaces, an upper engagement surface 260 and a lower engagement surface 270. The present embodiment also has two opposing side surfaces adjacent to the engagement surfaces, an inner circumferential surface 280 and an outer circumferential surface 290. The embodiment shown in FIGS. 2 and 3 has one lobe on the lower engagement surface 270 and two lobes on the upper engagement surface 260. In further embodiments, the lobes may form discontinuous circumferential structures on an engagement surface.

The lobed seal member 170 is of a rubber or other like compound, such as EPDM, and a presently preferred embodiment has a durometer value of approximately 42 Shore A. Other durometer values may be acceptable given the desired application. In one preferred embodiment, the temperature range for the lobed seal member to perform adequately is from −70 to plus 250 degrees Fahrenheit. Other operable temperature ranges may be acceptable given the desired application.

As shown in FIG. 3, one embodiment of the lobed seal member 170 is generally square and defined by the upper engagement surface 260, the lower engagement surface 270, the inner circumferential surface 280, and the outer circumferential surface 290. In this embodiment, the top engagement surface 260 has two lobes formed thereon, with the lobes each being generally half circles. The lobes further define an inner shoulder 300 aligned with an inner circumferential surface 280 and an outer shoulder 310 aligned with an outer circumferential surface 290. In other embodiments the lobes may have shapes other than half-circles, such as without limiting by example, triangular, square, oval, and other shapes depending on the intended application. In further embodiments the lobes may have circular shapes greater than or less than half-circles, for example, they may form substantially complete circles.

The upper engagement surface 260 has two annular lobes, an inner lobe 330 and an outer lobe 340. In the present embodiment, as shown in FIG. 3, the outer shoulder 310 of the outer lobe 340 of the upper engagement surface 260 is contiguous with the outer circumferential surface 290, and the inner shoulder 300 of the inner lobe 330 of the upper engagement surface 260 is contiguous with the inner circumferential surface 280. In other embodiments the outer shoulder of the outer lobe, and the inner shoulder of the inner lobe may not be contiguous with the circumferential surfaces. In further embodiments, one lobe may have a shoulder that is contiguous with a circumferential surface and the other lobe may not.

The lower engagement surface 270 has a lower annular lobe 320 positioned about the middle of the lower engagement surface 270 such that there is an area of the lower engagement surface 270 on either side of the lower annular lobe 320. In this embodiment, the width of the lower annular lobe 320 is about one-third the total width of the lower engagement surface 270. In other embodiments, the lobe may not be positioned in the middle of the engagement surface, but may be positioned closer to one circumferential surface than the other circumferential surface. In further embodiments a single lobe may have a shoulder that is contiguous with a circumferential surface similar to the upper lobes in FIG. 3.

As shown in FIG. 3, the inner lobe 330 of the upper engagement surface 260 is separated from the outer lobe 340 of the upper engagement surface 260 by a valley 350. In the present embodiment, the valley 350 has a floor 360 and walls 370. The walls 370 of the valley 350 are the outer annular shoulder 310 of the inner lobe 330 and the inner annular shoulder 300 of the outer lobe 340. In the present embodiment, the valley floor 360 may be defined by the upper engagement surface 260. In other embodiments the valley floor may be positioned below the level of the engagement surface or above the level of the engagement surface. In further embodiments the valley floor may be defined by the intersection of the outer shoulder and inner shoulder of adjacent lobes, forming a "V" shape.

In the embodiment shown in FIG. 3, and by way of example only, the lobed seal member is approximately one-quarter inch tall, and 0.312 inches wide from inner radius to outer radius. In this embodiment, the lobes are approximately 0.063 inches in radius, and thus the total height of the lobed seal member from the tip of a top lobe to the tip of a bottom lobe measures approximately 0.375 inches. Also in this embodiment, and by way of example only, the inner diameter of the lobed seal member may be approximately 7.5 inches.

Figure 4:
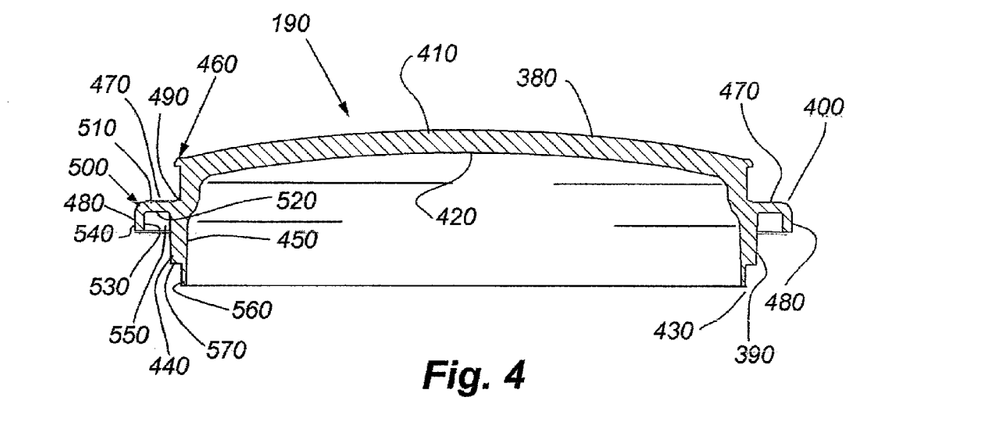
FIG. 4 is a cross-sectional view of a cap insert taken along line 4-4 of FIG. 1.

FIG. 4 is a cross-sectional view of the cap insert 190. In the present embodiment, the cap insert 190 may be circular and have an upper surface that is generally curved. The cap insert 190 comprises a dome 380, an axial wall 390, and an annular shoulder structure 400. The dome 380 has a top surface 410 and a bottom surface 420, the bottom surface is in fluid communication with the chamber 210 of the debris trap receptacle 110. The axial wall 390 extends downward from the dome 380 to an axial wall base 430. The axial wall 390 further includes an outer axial wall 440 and an inner axial wall 450. At the periphery of the top surface 410 of the dome 380 are a plurality of tab structures 460. The tab structures 460 extend radially from the periphery of the dome 380 upper surface 410. As will be explained below, the tab structures 460 aid in retaining the cap insert 190 within the locking ring 200. In some embodiments the dome surface may be concave, convex, or flat.

Extending out radially from the outer axial wall 440 of the cap insert 190 is the shoulder structure 400. The shoulder structure 400 is further comprised of a shelf structure 470 and a flange 480. The shelf structure 470 is generally perpendicular to the axial wall 390 and extends out radially from a proximal end 490 to a distal end 500. Further, the shelf structure 470 defines a top shelf surface 510 and a bottom shelf surface 520. The distal end 500 of the shelf structure 470 is connected to the flange 480 that extends perpendicular to the shelf structure 470. The flange structure 480 has an inner facing flange wall 530 adjacent to the lower shelf surface 520, and an outer facing flange surface 540.

The bottom shelf surface 520, the inner facing flange wall 530, and the outer axial wall 440 define an annular channel 550. The present embodiment, further includes an annular indentation 560 at the base 430 of the outer axial wall 440. The annular indentation 560 has a shelf structure 570 positioned upward from the base 430 of the outer axial wall 440. As discussed below, the annular channel 550 and the annular indentation 560 may receive the lobed seal member 170 and the O-ring seal 180 respectively.

Figure 5:
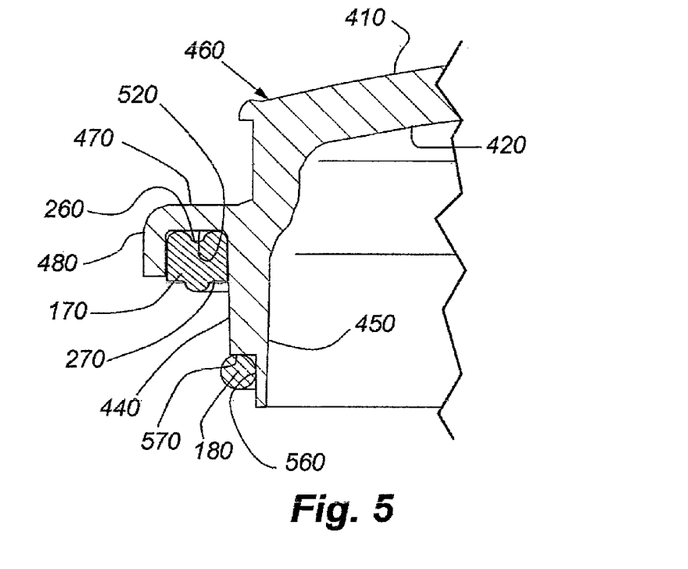
FIG. 5 is an enlarged partial section of the cap insert as shown in FIG. 4 showing the position of both the lobed seal member and O-ring seal.

As shown in FIG. 5, the lobed seal member 170 is seated in the annular channel 550 of the cap insert 190. Where the lobed seal member 170 has two lobes on one surface and one lobe on another, as in the present embodiment, the lobed seal member 170 may be placed in the annular channel 550 either with the dual lobes facing the cap insert 190, or with the dual lobes facing the debris receptacle 110. While either orientation of the lobed seal member is possible, the preferred embodiment is shown in FIG. 5, where the upper engagement surface 260, with two lobes, is positioned upward in contact with the lower surface 520 of the shelf structure 470 of the cap insert 190 and the lower engagement surface 270, with a single lobe, is positioned downward.

Also shown in FIG. 5 is the placement of the O-ring seal 180 in the annular indentation 560. In this embodiment the O-ring 180 is shown positioned in contact with the shelf 570 of the annular indentation 560 which may prevent further upward movement of the O-ring 180. Other embodiments may include an annular groove having a second shelf positioned below the O-ring to prevent downward movement of the O-ring on the axial wall. Further embodiments may position the O-ring other than at the base of the axial wall. Other embodiments may have a lobed seal member positioned at the annular indentation. Further embodiments may not include an O-ring seal on the axial wall.

Figure 6:
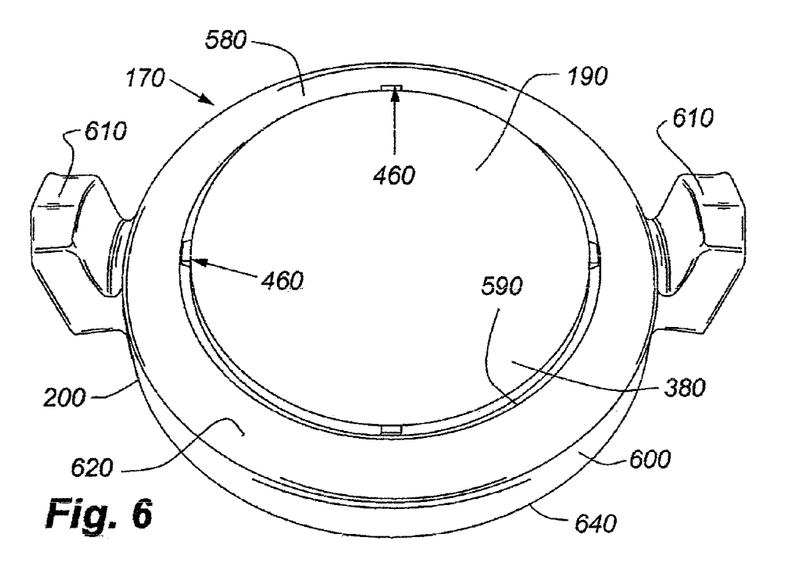
FIG. 6 shows a top perspective view of an assembled lid.

FIG. 6 is a perspective top view of the lid 570 wherein the cap insert 190 is removably engaged with the locking ring 200. The cap insert 190 is positioned inside the locking ring 200 to hold the cap insert 190 in place when the debris trap receptacle 110 is closed. In the embodiment shown in FIG. 6, the locking ring 200 includes a rim 580 with an upper surface 620. The rim 580 defines an inner ring edge 590 and an outer ring edge 595. Extending downward from the outer ring edge 595 is a skirt flange 600 which extends away from the rim 580 to a base 640. Positioned on the skirt flange 600 are a plurality of handles 610.

The inner ring edge 590 of the rim 580 is designed to accept the cap insert 190 and allow the dome 380 of the cap insert 190 to extend above the upper surface 620 of the rim 580 (see FIG. 5). The tab structures 460 of the cap insert 190 extend radially from the periphery of the dome 380 upper surface 410 over the ring surface 580 to aid in removably engaging the cap insert 190 and locking ring 200. In various embodiments the entire dome may not extend above the upper surface of the rim such as where the dome is concave rather than convex as is the current embodiment.

Figure 7:
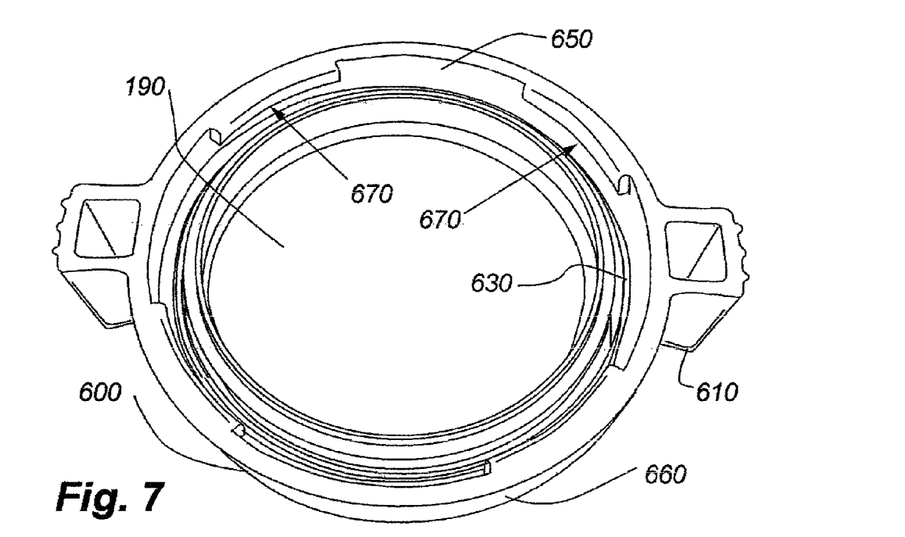
FIG. 7 shows the bottom perspective view of the assembled lid in FIG. 5.

FIG. 7 shows the locking ring 570 seen in perspective from below. The rim 580 defines a lower surface 630 which rests upon the shelf structure 470 of the top surface 510 of the cap insert 190. The skirt flange 600 of the locking ring 200 extends downward from the outer ring edge 595 of the rim 580 to the base 640. The skirt flange 600 defines an inner wall 650 and an outer wall 660. Extending outward from the outer wall 660 of the flange 600 are a plurality of handles 610 to allow a user to grasp and rotate the lid 570 as needed.

At the base 640 of the inner wall 650 of the flange 600 are a plurality of bayonets 670 which extend radially inward toward the center of the locking ring 200. As described below the bayonets 670 are designed to engage the flanges 240 at or near the upper rim structure 220 of the debris trap receptacle 110.

Figure 8A:
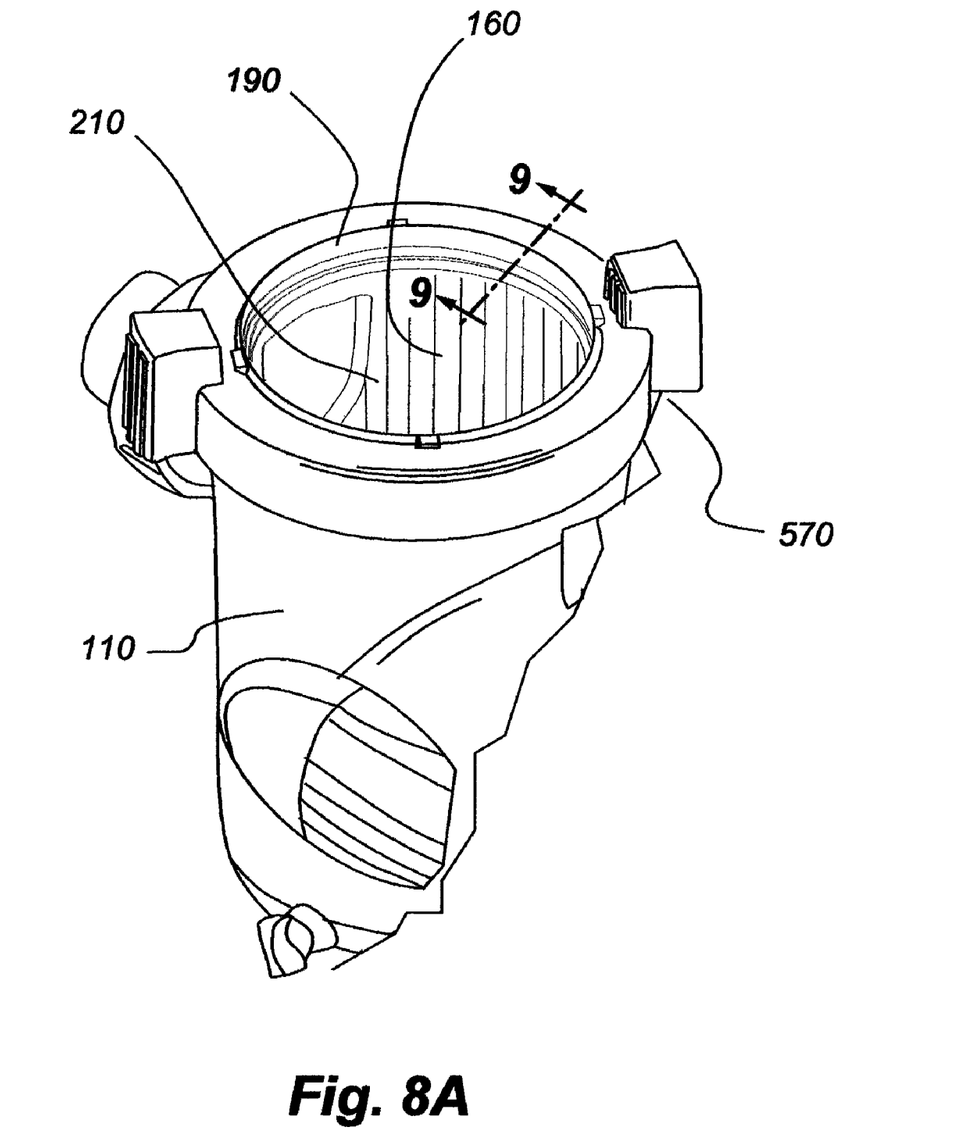
Figure 8B:
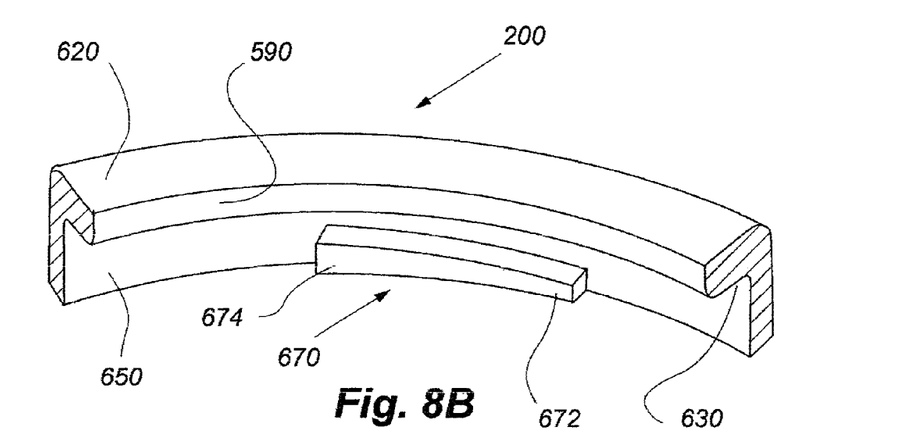
Figure 8C:
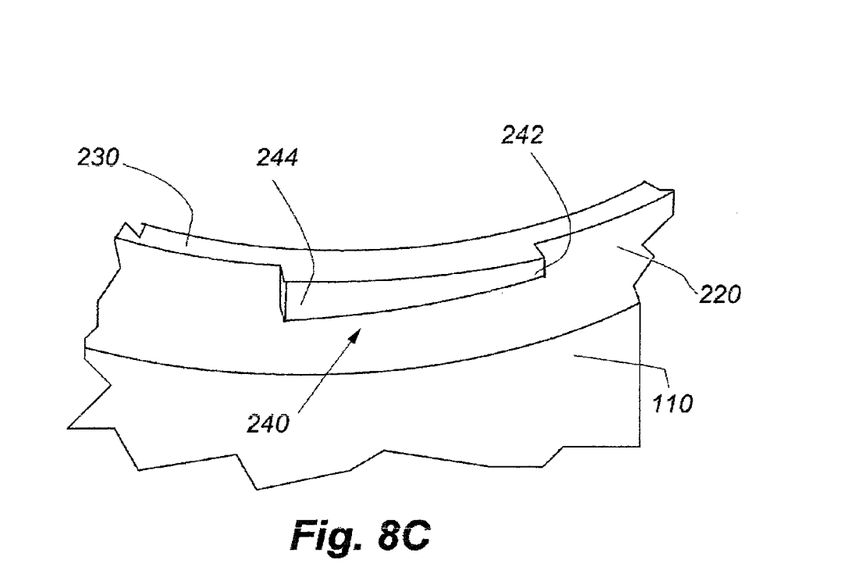

FIG. 8A shows the assembled, water pump/filter assembly 100 depicted in FIG. 1. In this figure, the lid 570 has been placed on the debris trap receptacle 110. In the present embodiment, the cap insert 190 is made of a clear plastic allowing a view into the chamber 210 of the debris trap receptacle 110. The debris basket 160 can be seen positioned within the chamber 210 of the debris receptacle 110. When the lid 570 is initially seated upon the debris trap receptacle 110 the bayonets 670 of the lid 570 may not be in contact with the flanges 240 of the debris trap receptacle 110. FIGS. 8B and 8C show the flanges 240 and bayonets 670 detailing their angled shape. As can be seen in FIGS. 8B and 8C, the flanges 240 have a thin end 242 and a thick end 244 and the bayonets 670 also have a thin end 672 and a thin end 674.

The vertical thickness of both the bayonets 670 of the lid 570 and the flanges 240 of the debris trap receptacle 110 changes along their radial length (i.e. to form an angle, ramp, or cam; see FIGS. 8B and 8C). This change in thickness of the flanges 240 and bayonets 670 aids in drawing the lid 570 downward and toward the upper rim structure 220 of the debris trap receptacle 110 as the locking ring 200 is rotated clockwise. Rotation of the locking ring brings the thicker portions of the bayonets 670 and flanges 240 into juxtaposition forcing the locking ring 200 down and into closer proximity to the debris trap receptacle 110. In further embodiments only the bayonet 670 vertical thickness may change, while the flanges 240 of the debris trap receptacle 110 does not, or vice versa.

Slight rotation of the lid 570 relative to the debris trap receptacle 110 causes the thin end of the bayonets 670 to make initial engagement with the thin vertical thickness end of the flanges 240. Further rotation and will cause additional engagement of the flanges 240 and bayonets 670 causing the lid 570 to move into closer proximity to the debris trap receptacle 110. This in turn will compress the lobed seal member 170 between the bottom shelf surface 520 of the cap insert 190 and the lip surface 230 of the debris trap receptacle 110 and aid in creating an adequate seal between the lid 570 and debris trap receptacle 110.

Figure 9:
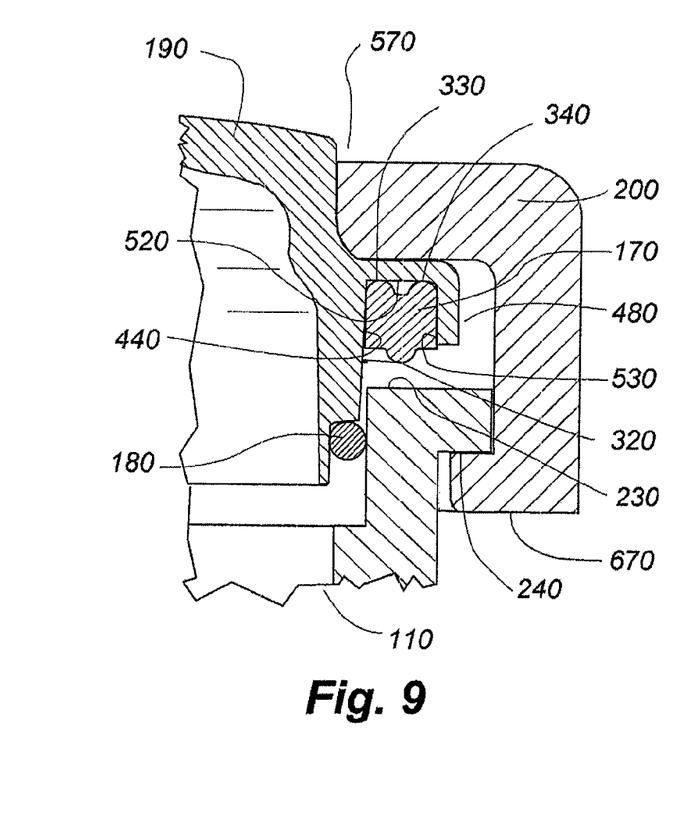
FIG. 9 shows a section view taken along line 9-9 of FIG. 8A of the locking ring assembly seated atop the rim of the debris trap receptacle, but not engaged.

FIG. 9 is an enlarged sectional view of FIG. 8A along line 9-9 showing an uncompressed lobed seal member 170. FIG. 9 shows the lid 570 seated on the debris trap receptacle 110. Here, both the lobed seal member 170 and the O-ring seal 180 are shown mounted on the cap insert 190. In this figure, the lobed seal member 170 is in contact with the cap insert 190, and the O-ring seal 180 is also seated in the cap insert 190 and the interior wall 250 of the debris trap receptacle 110. The bayonets 670 of the locking ring 200 are shown in the position of initial engagement with the flanges 180 of the debris trap receptacle 110.

In the embodiment shown in FIG. 9, the height of lobed seal member 170, as measured from the lower lobes to the upper lobes, is greater than the length of the inner facing flange wall 530. Thus, when the inner and outer upper lobes 330 and 340 of the lobed seal member 170 are in contact with the bottom shelf surface 520, the lobed seal member 170 will extend beyond the flange structure 480. This difference in height of the lobed seal member 170 and flange structure 480 help ensure that upon compression the lobed seal member 170 will form an adequate sealed engagement between the cap insert 190 and debris trap receptacle 110 before the flange structure makes contact with the upper rim structure 220 of the debris trap receptacle 110. Here the lower lobe 320 may make contact with the lip surface 230 at the upper rim structure 220 of the debris trap receptacle 110. The O-ring seal 180 is shown seated in the annular channel or indentation 560 of the cap insert 190 and is in sealing contact with the interior wall 250 of the debris trap receptacle 110. When in place, the O-ring 180 ads a secondary seal between the lid 570 and debris trap receptacle 110. As noted above, other embodiments may lack the O-ring or may have a lobed seal 170 seated in the annular indentation 560.

Figure 10:
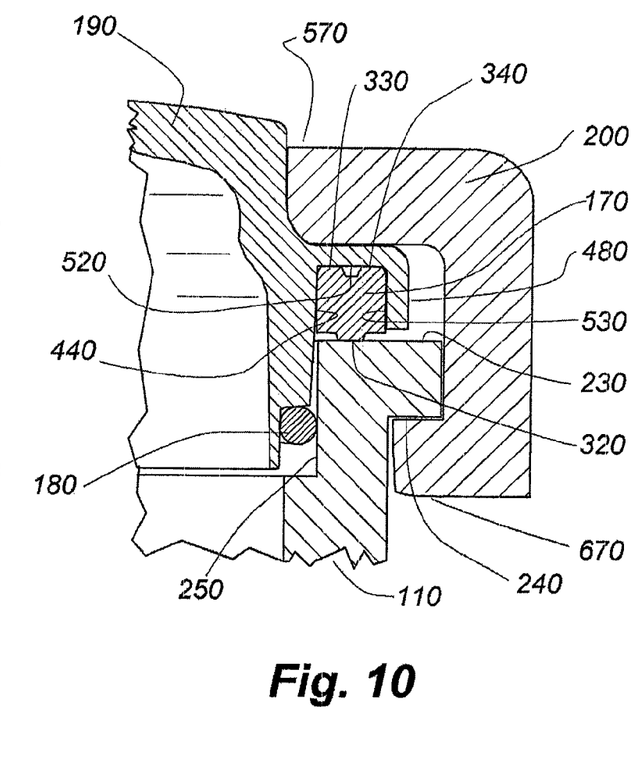
FIG. 10 is a representative section view of the lid engaged with the debris trap receptacle, where the lid has been rotated relative to the view in FIG. 9 in order to fully engage and compress the lobed seal member.

FIG. 10 shows compression of the lobed seal member 170 between the cap insert 190 and the lip surface 230 when the lid 570 is further engaged with the debris trap receptacle 110. This compression has deformed the inner and outer upper lobes 330, 340 against the bottom shelf surface 520 of the cap insert 190, and the lower lobe 320 is deformed against the lip surface 230. FIG. 10 is a representative view of FIG. 9 wherein the locking ring 200 has been rotated in relation debris trap receptacle 110 beyond the point of initial engagement of the bayonets 670 and flanges 240. This rotation brings the cap insert 190 and lip surface 230 of the debris trap receptacle 110 into closer proximity than that shown in FIG. 9. This closer proximity causes compression of the lobed seal member 170 such that the lobed seal member 170 is in sealing engagement with the cap insert 190 and the lip surface 230 of the debris trap receptacle 110. If the compression of the lobed seal member 170 is significant, then the lobes may be flattened and the valley 350 between two adjacent lobes on a single engagement surface may also form a sealed engagement.

As shown in the embodiment depicted in FIG. 10, when in the compressed position, the lower lobe 270 is in sealing engagement with the lip surface 230 of the debris trap receptacle 110 and forms at least one line of sealing engagement with the lip surface 230 of the debris trap receptacle 110. If the compression is significant, then entire lower engagement surface 270 may also form a sealed engagement, and thereby make substantially the entire surface be in sealing engagement with the lip surface 230 of the debris trap receptacle 110.

While the present embodiment discloses an annular channel 550 defined by the cap insert 190 to receive the lobed seal member 170, other embodiments may have the lobed seal member 170 seated in the lip of the debris trap receptacle. In some embodiments, the lip of the debris trap receptacle may include an annular channel to receive the lobed seal member and the cap insert may have a flat surface that contacts the lobed seal member when the lid is seated on the debris trap receptacle.

Thus as depicted in FIG. 10, the presently disclosed multi-lobed seal member provides for additional lines of adequate sealing engagement between parts of a pool-filter assembly. The multi-lobed seal member described herein may make it easier to engage and disengage the lid from the debris trap receptacle for maintenance, repair, and cleaning. In some embodiments the multi-lobed seal member may provide similar adequate sealing engagement with less compressive force. In other embodiments the multi-lobed seal member may provide additional lines of sealing engagement with similar compressive force. In some embodiments compressive force may be applied up to the point where the cap insert 190 is in contact with the lip surface 230 of the debris trap receptacle.

Use of the multi-lobed seal may allow for adequate sealing of the seal surfaces of two objects using less compressive force than required to adequately seal objects using an O-ring. Thus, the multi-lobed seal may be used to seal surfaces between objects in cramped or difficult-to-access places. In a cramped environment with limited access, it may be difficult for a person to obtain the leverage necessary to apply sufficient force to either adequately seal the objects or to break the seal. For example, many fluid handling systems for pools and spas may be placed in cramped environments making it difficult for a person to access various components. In these environments it may be difficult to remove an object in sealing engagement with another object when an O-ring has been used. However, use of the multi-lobed seal may allow an operator to create an adequate seal between the objects with less effort. In addition, a sealing engagement created using a multi-lobed seal may also be broken with less compressive force applied by the operator. In another application, the multilobed seal may be used to make an adequate seal where access is limited to a single hand or arm contacting the object, for example a pipe connection.

FIGS. 11A-I show alternative lobed seal member embodiments where the lobed seal member is seated in the annular channel 550 of the cap insert 190, defined by the bottom shelf surface 520, the inner flange wall 530, and the outer axial wall 440. In these embodiments, the uncompressed lobed seal member is in contact with the lip surface 230 of the debris trap receptacle 110. Also visible in these figures is the locking ring 200. While the lobed seal members 700, 750, 800, 900, 1000, 1100, 1200, 1210, 1220 shown in these figures are in contact with the lip surface 230, the lobed seal members are mostly uncompressed as in FIG. 9. Furthermore, while the lobes depicted are half-circles, as described above, the lobes may take various shapes including substantially full circles as well as non-circles.

Figure 11A:
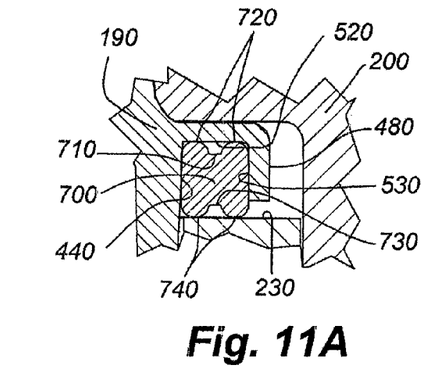
Figure 11B:
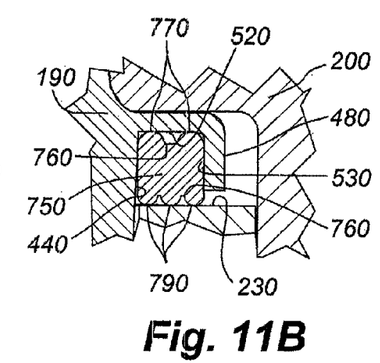
Figure 11C:
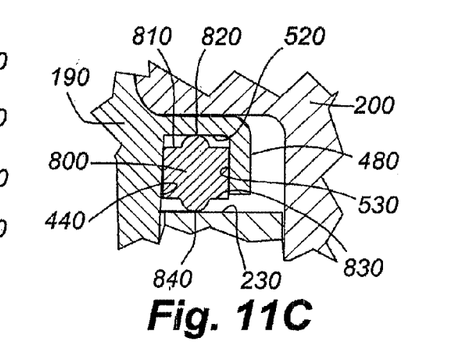

FIG. 11A shows a lobed seal member 700 with an upper engagement surface 710 having two lobes 720 and an opposed, lower engagement surface 730 having two lobes 740. FIG. 11B depicts a lobed seal member 750 embodiment having an upper engagement surface 760 with two lobes 770 and a lower engagement surface 780 having three lobes 790. FIG. 11C shows a lobed seal member 800 embodiment with an upper engagement surface 810 having one lobe 820, and a lower engagement surface 830 having one lobe 840. Further embodiments may possess various number of lobes on opposed engagement surfaces. Additional embodiments may also differ in the size and placement of the lobes. In some embodiments the lobes may be separated by engagement surface, or in further embodiments the lobes may be placed in close proximity such that the sides of adjacent lobes are in direct contact.

Figure 11D:
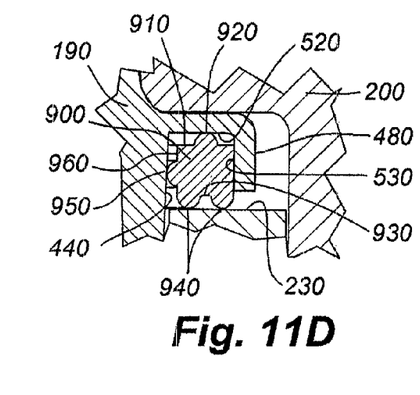
Figure 11E:
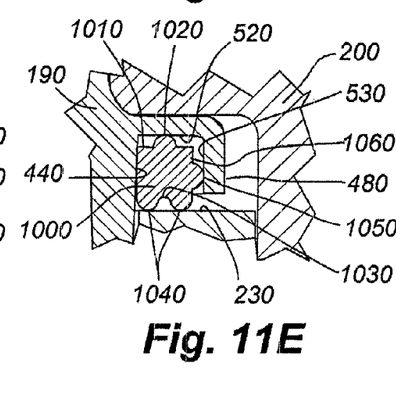
Figure 11F:
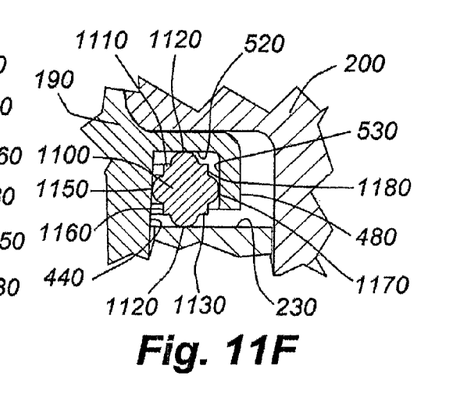

FIGS. 11D-F show further embodiments having lobes on adjacent engagement surfaces. For example, as shown in FIG. 11D, a lobed seal member 900 embodiment may be similar to the present embodiment in that it may have an upper engagement surface 910 and an opposed lower engagement surface 930 where in both engagement surfaces have lobes, 920 and 940, but this embodiment may also have a lobe 950 on an inner circumferential surface 960. As shown in FIG. 11E, a lobed seal member 1000 embodiment may have an upper engagement surface 1010 with a lobe 1020 and an opposed lower engagement surface 1030 with two lobes 1040, and also have a lobe 1050 on an outer circumferential surface 1060. FIG. 11F shows a lobed seal member 1100 embodiment having an upper engagement surface 1110 with a lobe 1120 and an opposed lower engagement surface 1130 with a lobe 1140, as well as a lobe 1150 on an inner circumferential surface 1160 and a lobe 1170 on an outer circumferential surface 1180. Further embodiments may have upper and lower engagement surfaces and circumferential surfaces with various combinations of lobes including an upper or lower engagement surface that does not have a lobe.

Figure 11G:
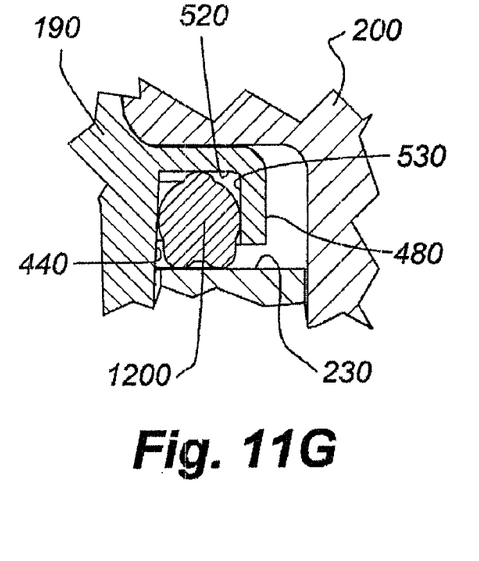
Figure 11H:
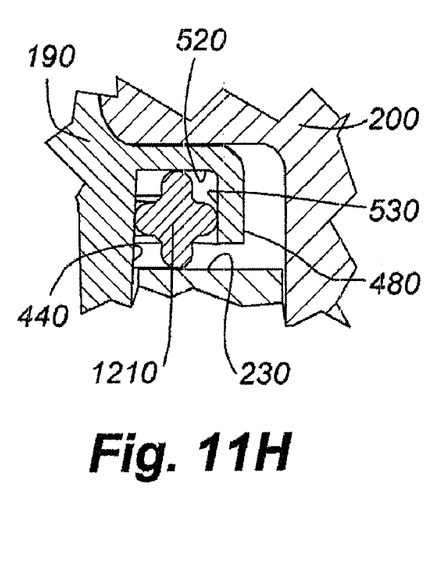
Figure 11I:
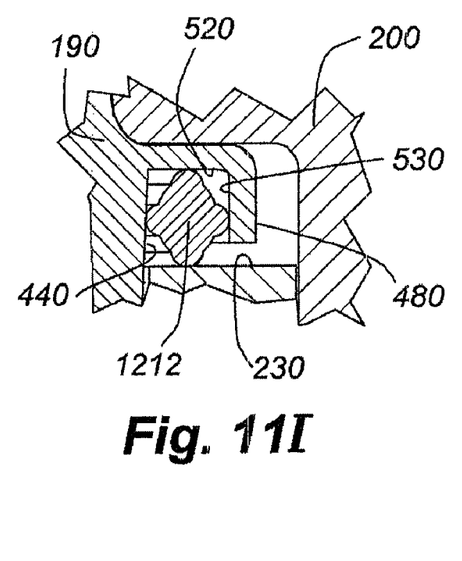

FIGS. 11G-I show lobed seal member embodiments that differ from the previous embodiments in that the cross-sectional shape is not generally square. For example, as shown in FIG. 11G, some embodiments may have a generally circular cross sectional lobed seal member 1200. In other embodiments, such as that shown in FIG. 11H, the cross-sectional shape of the lobed seal member 1210 may be a cross or "X." In still other embodiments, as shown in FIG. 11I, the cross-sectional shape of the lobed seal member 1220 may be substantially oval.

Seal as used herein is to be construed broadly and is not meant to imply an impenetrable, absolute, or hermetic seal. Seal as used herein describes a barrier that is adequate for the intended uses and in some embodiments may allow for leakage of gases or fluids.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the example of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

It will be apparent to those of ordinary skill in the art that variations and alternative embodiments may be made given the foregoing description. Such variations and alternative embodiments are accordingly considered within the scope of the present invention.

We claim:

1. An at least partially sealed structure comprising:
a receptacle having a continuous top seal face and an interior wall;
a cap insert having a channel having both a base wall and opening toward said top seal face of said receptacle and an annular indentation with a shelf structure;
a first seal having first and second opposing engagement surfaces, each with at least one engagement lobe formed thereon, said seal being positioned in said channel with at least two lobes positioned in engagement with said base wall, and said at least other lobe positioned in engagement with said top seal face,
wherein the number of lobes on said first engagement surface is greater than the number of lobes on said second engagement surface,
wherein the first seal further comprises an inner circumferential surface and an outer circumferential surface connecting the two engagement surfaces therebetween, and
wherein the lobes have an arcuate cross section and each lobe has a same height relative to the engagement surface, and
wherein the at least two lobes are separated by a valley and at least one of the at least two lobes is positioned adjacent to the inner circumferential surface and at least one of the at least two lobes is positioned adjacent to the outer circumferential surface, and
the at least other lobe is positioned approximately opposite the valley;
a locking ring engaging said cap insert and said receptacle to compress said seal into engagement with said top seal face and said base wall; and
a second seal having a receptacle engaging surface and a cap insert engaging surface, said second seal being positioned in said annular indentation with the cap insert engaging surface positioned in engagement with at least said shelf structure, and said receptacle engaging surface positioned in engagement with said interior wall.

2. The seal structure of claim 1 wherein each lobe has a same width at a base of said lobe.

3. The seal structure of claim 1, wherein said number of lobes on said first engagement surface is at least two, and said number of lobes on said second engagement surface is at least 1.

4. The seal structure of claim 1, wherein the at least one lobe formed on the first engagement surface and the at least one lobe formed on the second engagement surface are annular.

5. The seal structure of claim 1, wherein said first and second engagement surfaces are oriented at an angle to one another.

6. The seal structure of claim 1, wherein said first and second engagement surfaces are parallel to one another.

7. The seal structure of claim 1, wherein said second seal is an O-ring.

8. The seal structure of claim 1, wherein the locking ring further includes bayonets and the receptacle further includes flanges for further sealingly engaging the locking ring with the cap insert and the receptacle.

* * * * *